(No Model.)

G. KÜSTERMANN.
LEAD AND CRAYON HOLDER.

No. 256,223. Patented Apr. 11, 1882.

Witnesses:
Frank Thomason
F. W. Kasehagen

Inventor:
Gustav Küstermann
By Wm H Lotz
Attorney

UNITED STATES PATENT OFFICE.

GUSTAV KÜSTERMANN, OF GREEN BAY, WISCONSIN.

LEAD AND CRAYON HOLDER.

SPECIFICATION forming part of Letters Patent No. 256,223, dated April 11, 1882.

Application filed November 23, 1881. (No model.)

*To all whom it may concern:*

Be it known that I, GUSTAV KÜSTERMANN, of Green Bay, in the county of Brown and State of Wisconsin, have invented certain new and useful Improvements in Lead and Crayon Holders; and I do hereby declare that the following is a full, clear, and exact description thereof, reference being had to the accompanying drawings and the letters of reference marked thereon, which form a part of this specification.

My invention relates to certain improvements in that class of lead and crayon holders which consist of a casing forming the handle and containing the lead, that may be adjustably projected from the casing at one end, can be entirely concealed and protected inside of the handle when not in use, and can be conveniently renewed.

The object of my invention is to simplify the construction of such lead and crayon holders without impairing their effectiveness; and my invention consists in providing one end of the tubular handle with jaws that are formed solid with said handle, and are shaped to grasp the lead by their elasticity, and stops for limiting the movement of the lead-holding tube, and in an internal lead receiving and guiding tube having a conical collar that enters the conical throat between the jaws, and having to its opposite end a cap-piece that is guided in the tubular handle and projects through the end of the same, and which with depressing will push the collar into the throat, so as to force said jaws apart for releasing the lead, all as more fully hereinafter described, and pointed out by the claim.

Figure 1:
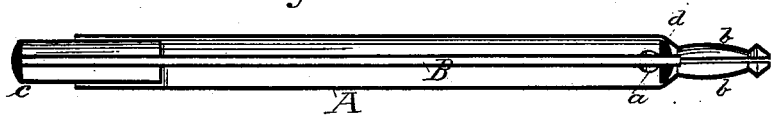
Figure 2:
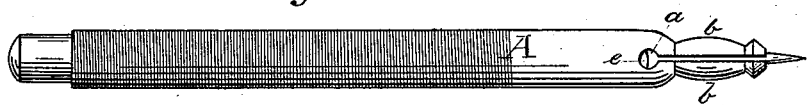
Figure 3:
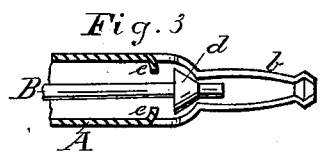
Figure 4:
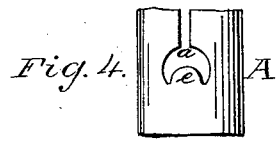

In the accompanying drawings, Figure 1 represents a longitudinal sectional view of my lead and crayon holder; Fig. 2, an exterior view of the same; Fig. 3, an enlarged sectional view of that portion of the handle which is punched, and thence the split for forming the jaw begins; and Fig. 4, an elevation of a portion of the handle illustrating the shape of a punch-hole up to which the jaws reach, and which are arranged to form the stops for limiting the motion of the internal tube.

Like letters represent corresponding parts in all the figures.

A denotes the tubular handle, which I prefer to corrugate, or to provide with spiral grooves or serratures, so as to have a better hold thereon. This tubular handle is open at one end, and its opposite end is made tapering. Two holes, $a\,a$, of a half-moon shape, are punched diametrically opposite each other into the handle, close to where the tapering commences, and from these holes to the pointed end of the tapering portion the handle is slit open, so as to form two jaws, $b\,b$, between which, by their elasticity, the lead is held firmly.

B is a smaller tube, of a sufficient inside diameter to form a sheath for the lead. This tube B has secured upon one end a cylindrical cap, $c$, which partly enters and longitudinally slides in the open end of handle A. The projecting end of this cap $c$ is closed. Near its opposite or inward end the tube B is surrounded by a rigid conical collar, $d$, which enters the throat in the tapering neck between the two jaws $b\,b$. The semicircular lips $e$ of punch-holes $a$ are bent inwardly after the tube B has been inserted, so as to form stops or shoulders behind the collar $d$, that will limit the longitudinal movement of the said tube, and will prevent it from dropping out.

For releasing or adjusting the lead the cap $c$ is pressed into the tube A, when the conical collar $d$ will press the jaws $b$ apart, when the lead or crayon will be released, and may be removed or shifted in either direction, and by removing the pressure from cap $c$ the jaws will close again. The serratures or corrugations on the handle will facilitate a firm hold on the handle or holder A while depressing the cap $c$.

This lead or crayon holder, as will be seen, is composed of three pieces only, viz: first, the handle or holder A, having the jaws; second, the internal tube B, carrying the conical collar; and, third, the cap $c$, that is secured upon the end of the tube B; and no separate spring is required for closing the lead-holding jaws, and its construction is such that it is practicable for its purpose, is durable, cannot get out of order, and can be manufactured very cheap.

What I claim is—

A lead or crayon holder composed of the tubular handle A, having jaws $b$ and stops $e$, all formed of a single piece of metal, said stops being formed by punching out a portion of each side of the handle, as described, in combination with the tube B, having conical collar $d$ and cap $c$, the whole of which being constructed and arranged substantially as set forth.

In testimony that I claim the foregoing as my invention I affix my signature in presence of two witnesses.

GUSTAV KÜSTERMANN.

Witnesses:
  LOUIS NEESE,
  OTTO C. DAVIDSON.